July 1, 1924.    D. PRICE    1,499,473
FLOWER BOX
Filed Dec. 21, 1920
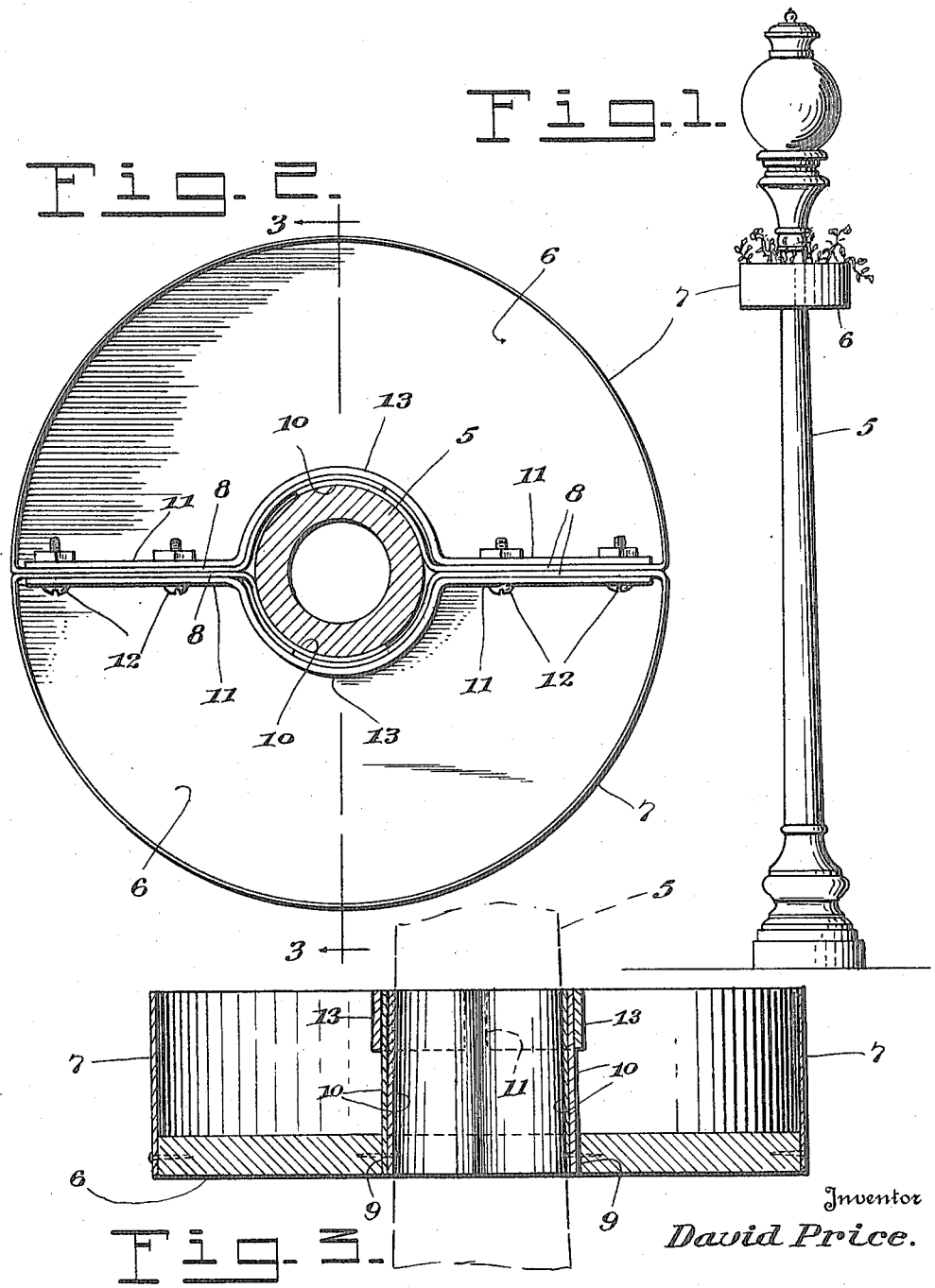
Inventor
David Price.
By
Attorneys Patented July 1, 1924.

1,499,473

UNITED STATES PATENT OFFICE.

DAVID PRICE, OF BUFFALO CENTER, IOWA.

FLOWER BOX.

Application filed December 21, 1920. Serial No. 432,261.

*To all whom it may concern:*

Be it known that I, DAVID PRICE, a citizen of the United States, residing at Buffalo Center, in the county of Winnebago and State of Iowa, have invented new and useful Improvements in Flower Boxes, of which the following is a specification.

The flower box which is the subject matter of the present application for patent has been designed more particularly for attachment to a lamp post or similar upright structure, and the invention has for its object to provide a flower box of this kind which is simple and durable in construction, and one which can be readily and securely attached to the post.

The object stated is attained by means of a novel combination and arrangement of parts to be hereinafter described and claimed, and in order that the same may be better understood, reference is had to the accompanying drawing forming a part of this specification.

In the drawing, Figure 1 is an elevation of a lamp post equipped with the flower box; Fig. 2 is a plan view of the box, with the lamp post shown in section, and Fig. 3 is a cross-section on the line 3—3 of Fig. 2.

Referring specifically to the drawing the flower box is made in two separate sections which are shaped at their meeting edges to produce a circular central opening in which is received the lamp post shown at 5. Each section comprises a bottom 6 and an upstanding outer side wall 7. The bottom may be made of wood, and the side wall can be a strip of tin or other sheet metal which is tacked or otherwise secured to the outer edge of the bottom. The two sections are shown as semi-circular in contour, and when they are assembled on the post 5 they form a circular box. Each section also has an inner side wall 8 formed by continuing the wall 7 along the straight inner edge of the bottom 6. Midway between its ends, the bottom 6 of each section has a semi-circular recess 9, and the wall 8 follows the edge of this recess, as shown at 10. Each inner side wall 8 is divided at the recess 9 and the free ends loosely overlap a substantial distance as shown in Fig. 2. When the two sections of the box are properly assembled, their inner walls 8 are contiguous, and the assembled box now has a circular contour, and the semicircular curved portions 10 of the walls 8 define a circular opening in the center of the box, in which opening the post 5 is adapted to be received. It will be understood that when the box is to be mounted on the post, the two sections will be placed on diametrically opposite sides of the post in such a manner that the walls 8 come together and the post seats in the central opening. The two sections are now drawn together to grip the post, which completes the attachment, it being understood that the box is adjusted on the post to the desired height before it is clamped thereto.

The clamping means for the box comprise strips 11 seating against the inner faces of the walls 8, and secured by bolts 12, said strips having semi-circular curves 13 intermediate their ends to conform to and follow the curves of the walls 8. The bolts 12 pass through both strips 11 and also through the walls 8 therebetween. The diameter of the central opening in which the post 5 seats is slightly less than the diameter of said post, and hence when the parts are placed as described to embrace the post, the latter will be firmly gripped when the walls 8 are drawn together by the strips 11 and the bolts 12. The box can therefore be easily applied or removed, and it can also be readily adjusted on the post for location at any height above the ground. This adjustment is made possible by the overlapping of the inner side walls 8 at the recess 9. These overlapping ends 10 being slidable on each other it is possible to contract the upper portions of the inner side walls 8 at the recess 9 to grip a post of varying diameter, it being understood however that no post may be used of greater diameter than the recess 9.

Particular attention is directed to Fig. 3 which illustrates that the curved straps 13 are located only at the upper edge portions of the side walls of the sections and consequently the tightening of the bolts 12 draws the side walls at the upper portions thereof inwardly and allows the lower portions of the side walls to remain substantially in their original positions. This permits the flower box to be attached to the upper portion of a tapered standard so that downward slipping of the box is positively prevented.

Attention is also directed to the fact that the overlapped end portions of the side walls provide a limited range of adjustment and decrease the cost of manufacture of the flower box as each section may have a single strip of metal tacked or otherwise secured to the bottom wall thereof. When the flower box is assembled as illustrated in Fig. 2 the overlapped end portions are entirely concealed from view.

I claim:

1. A flower box for vertical posts comprising sections having side walls, the ends of each side wall being overlapped at the point of engagement with the posts and being free from permanent connection with each other, clamping straps extending along the upper edge portion of said side walls with their intermediate portions overlying the overlapped ends of the side walls of each section, and bolts extending through the straps and the side walls to tightly engage the upper edge portions of the overlapped ends of the side walls with a post.

2. A flower box for vertical tapered posts comprising a pair of similarly formed sections having side walls, the ends of each side wall being overlapped with each other and being free from permanent connection with each other, clamping straps extending only along the upper edge portions of said side walls with their intermediate portions overlying the overlapped ends of said side walls of each section, and means extending through the straps and the side walls to tightly engage the upper edge portions of said side walls with a tapered post.

In testimony whereof I affix my signature.

DAVID PRICE.